United States Patent
Gretz

(10) Patent No.: US 6,194,657 B1
(45) Date of Patent: Feb. 27, 2001

(54) MOUNTING DEVICE

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 09/262,528

(22) Filed: Mar. 4, 1999

Related U.S. Application Data

(63) Continuation-in-part of application No. 09/178,402, filed on Oct. 10, 1998.

(51) Int. Cl.$^7$ ..................................................... H01H 9/02
(52) U.S. Cl. ............................................. 174/53; 439/107
(58) Field of Search .................................. 174/51, 53, 50, 174/17 R, 58; 220/3.2, 3.3, 4.02; 439/535, 107; 248/27.1

(56) References Cited

U.S. PATENT DOCUMENTS

| | | | |
|---|---|---|---|
| 3,609,647 | * 9/1971 | Castellano | 439/535 |
| 4,000,874 | * 1/1977 | Finley et al. | 248/27.1 |
| 4,012,580 | * 3/1977 | Arnold | 174/53 |
| 4,019,647 | * 4/1977 | Arnold | 220/3.3 |
| 4,063,660 | * 12/1977 | Ware | 220/3.6 |
| 4,263,472 | * 4/1981 | Maheu | 174/51 |
| 4,296,870 | * 10/1981 | Balkwill et al. | 220/3.3 |
| 4,724,281 | * 2/1988 | Nix et al. | 174/53 |
| 5,740,936 | * 4/1998 | Nash | 220/3.3 |

* cited by examiner

Primary Examiner—Kristine Kincaid
Assistant Examiner—Dhiru R Patel

(57) ABSTRACT

The present invention uses a plastic mounting device having an open front plate extending around an opening in a building wall integral with a closed electrical box extending at right angles therefrom rearward of the front plate and extending into the building wall. The mounting device has two turning screws adapted to turn flags which are inserted into the opening in a "closed" position and grab the far or inside surface of the building wall when the screws are rotated causing the flags to obtain their "open" position. An alternative embodiment incorporates a second set of flags positioned behind the first set for installation in a wall too thick to permit engagement of the first set of flags.

10 Claims, 4 Drawing Sheets

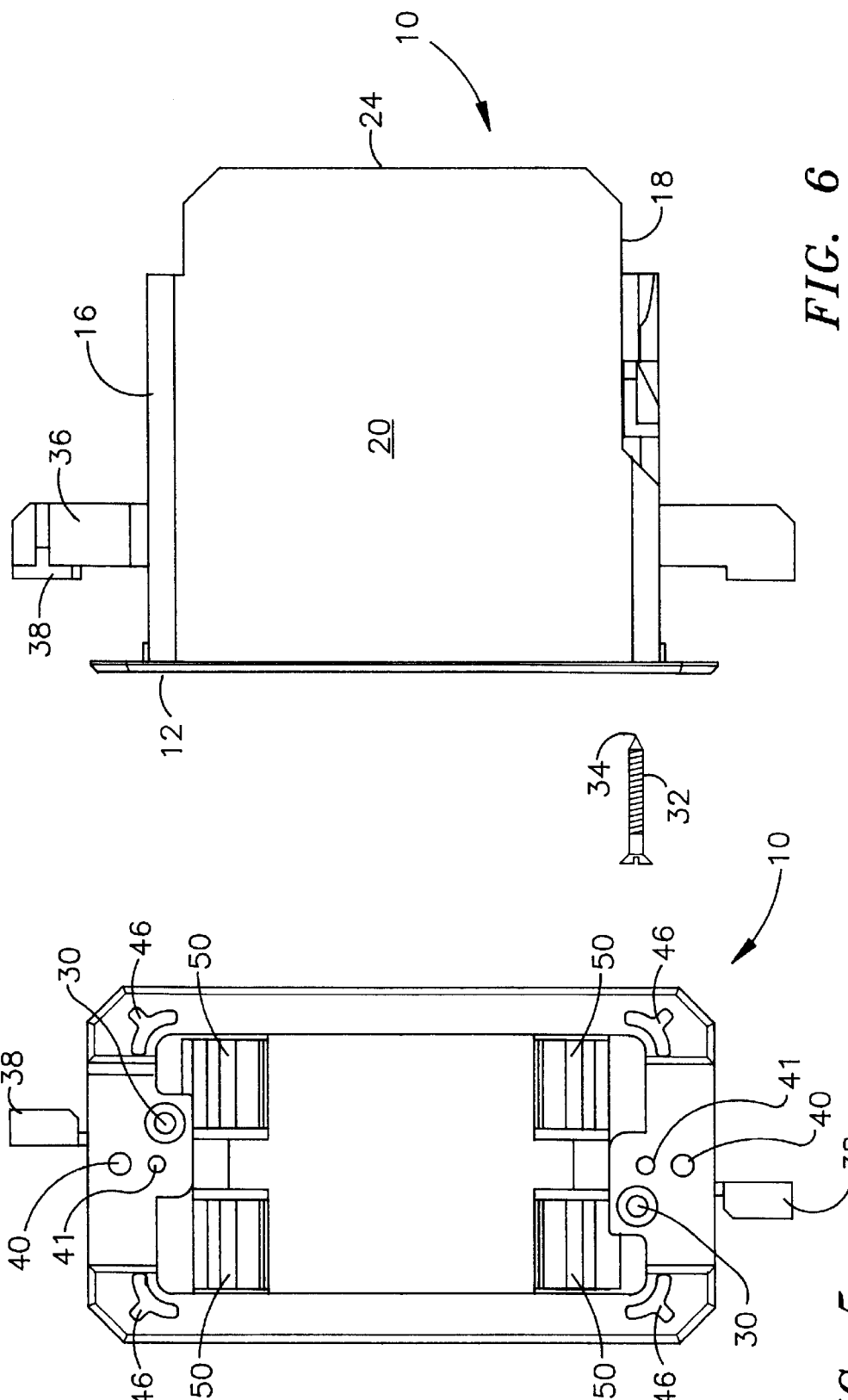

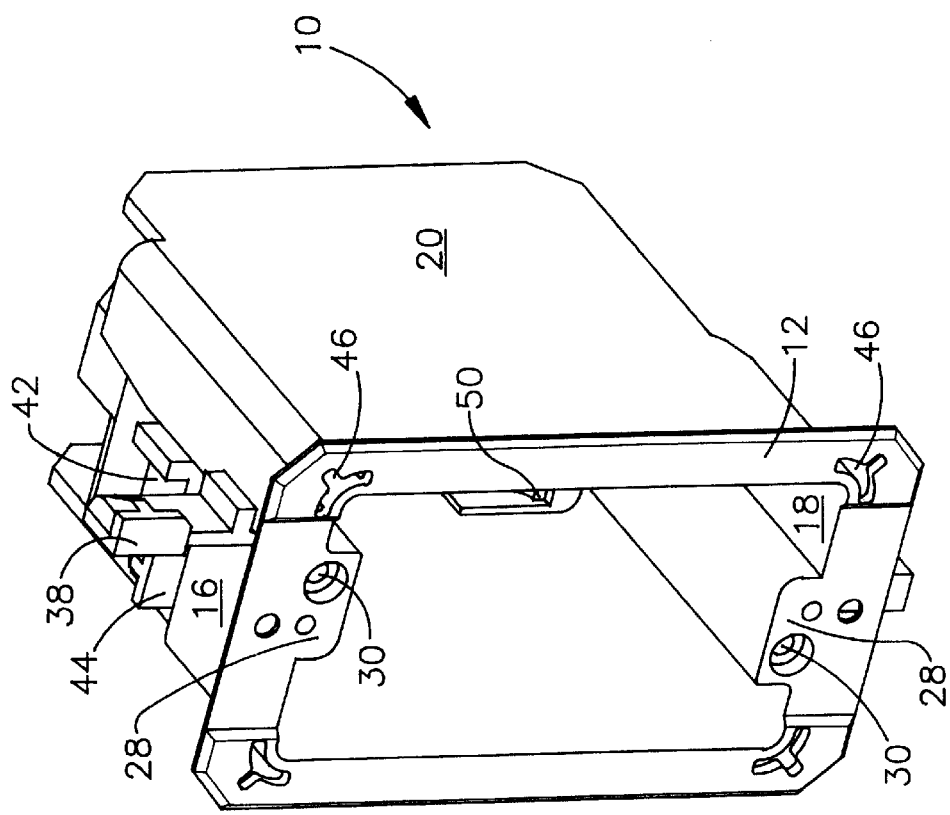
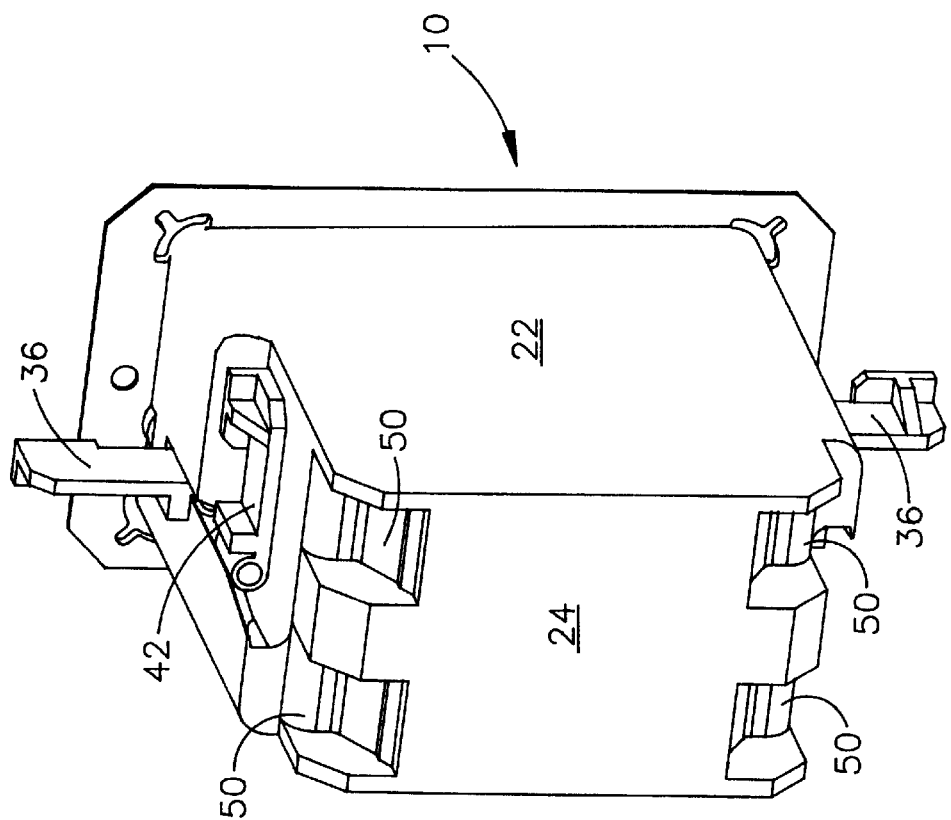

MOUNTING DEVICE

This is a continuation-in-part of application Ser. No. 09/178,402, filed Oct. 10, 1998, and now U.S. Pat. No. 6,093,890.

FIELD OF THE INVENTION

The present invention relates to electrical mounting devices and especially to wall mounted electrical box boxes.

BACKGROUND OF THE INVENTION

There exist several methods for installing an additional electrical outlet box in an existing wall. Most of these involve cutting a hole in the wall large enough to attach an electrical outlet box to a stud or other existing structural member and attaching a metallic or plastic box to the stud. Such installations pose the problem of having to cover the installation with an oversized cover. Additionally, the retrofitted outlet box may not be installed in exactly the position desired because of the need to attach it to an existing stud.

U.S. patent application Ser. No. 09/178,402, files Oct. 24, 1998 and copending herewith, describes a low voltage wall mounting device that comprises a frame, an integral reinforcing flange that fits into a rectangular hole in a wall and two flags which are rotated by front mount screws for grabbing the rear surface of the wall and securing the mounting device to the wall. This copending application is incorporated herein by reference in its entirety. Such an arrangement permits installation of additional low voltage mounting devices or boxes at any location on the surface of a wall. Additionally, the hole cut for installation is approximately of the same size as the inserted box, making the use of an oversized cover plate unnecessary. This copending application suggests, but not describe, that, "the flange or device wall may extend deeper into the building wall and have the inside enclosed to provide a box". The copending application, does not however address the issue as it relates to the more conventional electrical or "working" boxes that are used as outlets for electrical current that must include a closed rear portion that admits electrical wiring through appropriate apertures that incorporate wire or cable-retaining devices.

OBJECT OF THE INVENTION

It is therefore an object of the present invention to provide a working electrical outlet box that can be installed at virtually any location in a wall with a minimum of effort and a minimum of disruption of the existing wall.

SUMMARY OF THE INVENTION

The present invention uses a plastic mounting device having an open front surface extending around an opening in a building wall integral with a closed electrical box extending at right angles therefrom rearward of the front surface and extending into the building wall. The mounting device has two turning screws adapted to turn flags which are inserted into the opening in a "closed" position and grab the far or inside surface of the building wall when the screws are rotated causing the flags to obtain their "open" position. The electrical box has a rectangular outside periphery that permits a simple rectangular cut to be made in the building wall for ready fitting of the device into the wall. The flags are located on opposite ends of the open front surface or electrical box near the center of the two opposite ends so that holding forces are applied in the most desired direction without having such forces applied at opposite corners.

DESCRIPTION OF THE DRAWINGS

FIG. 5 is a rear view of an alternative embodiment of the mounting device of the present invention.

FIG. 6 is a left side view of the mounting device of FIG. 5.

FIG. 7 is a rear perspective view of the mounting device of FIG. 5.

FIG. 8 is a front perspective view of the mounting device of FIG. 5.

DETAILED DESCRIPTION

Figures 1, 2:
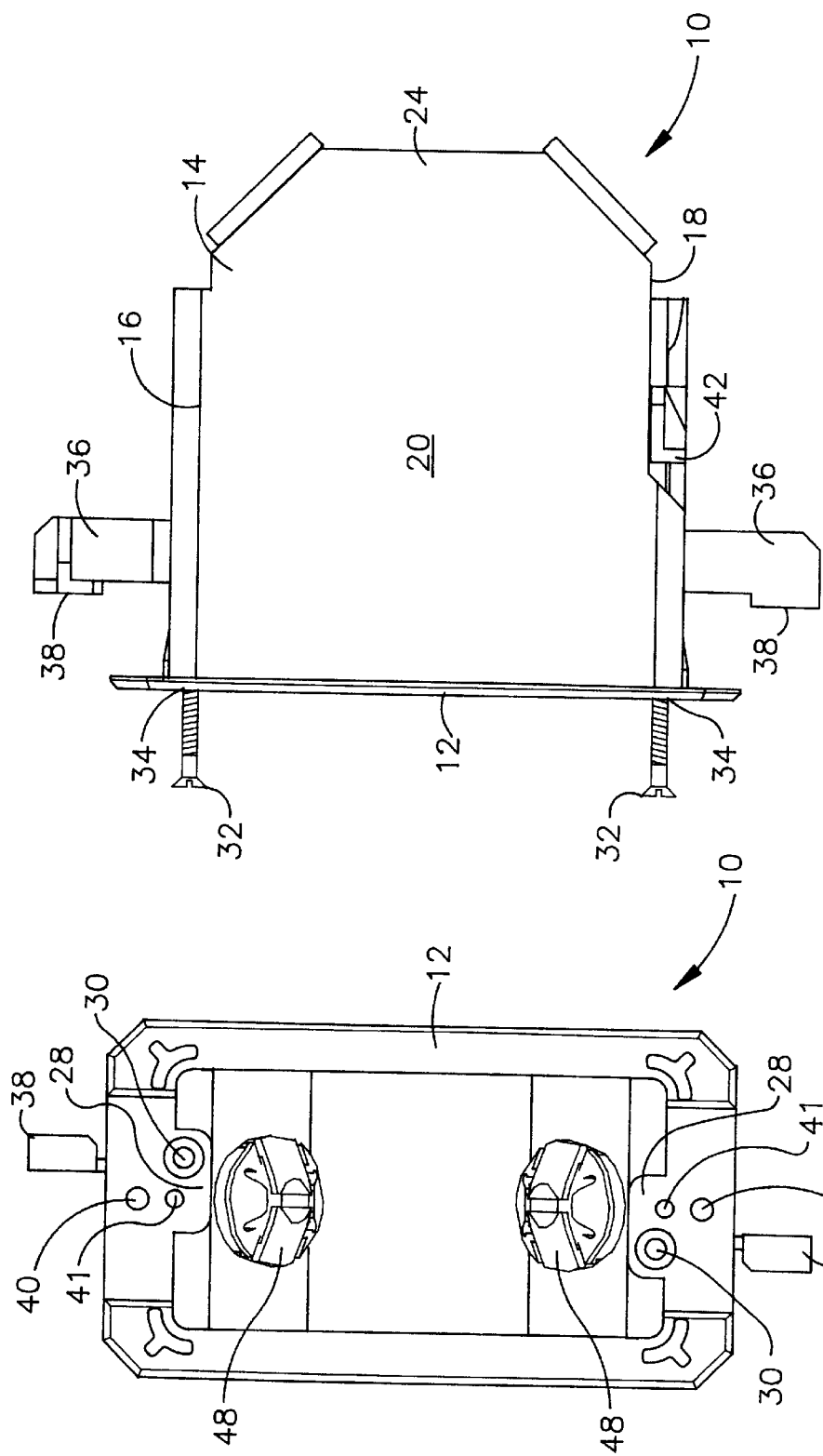
FIG. 1 is a front view of the mounting device of the resent invention.
FIG. 2 is a left side view of the mounting device of FIG. 1.

As shown in FIGS. 1–4 that depict various views of a first preferred embodiment of the mounting device of the present invention, the mounting device of the present invention 10 comprises an open front plate 12 adapted to extend around an opening in a wall (not shown). Integral with open front plate 12 is an electrical outlet box 14 that extends rearward from open front plate 12. Electrical outlet box 14 comprises an enclosed space having top and bottom walls 16 and 18, right and left walls 20 and 22, and rear wall 24.

The outside periphery of electrical box 14 is rectangular in shape. This permits an opening to be made in a building wall by simply cutting a rectangular hole with a minimum of effort and dropping mounting device 10 into the hole.

At the inside periphery 26 of electrical box 14 and integral therewith, are mounting blocks 28. It should be noted that mounting blocks 28 are located on opposite sides of mounting device 10 and in the approximate center of the side. The reason for this arrangement will be discussed in greater detail below.

Within each of mounting blocks 28 are turning screw holes 30 each of which are designed to receive, but not engage, a turning screw 32, screw holes 30 being smooth and not threaded and of a size to permit free passage of turning screw 32 therein. Each turning screw 32 has a leading edge 34. Leading edge 34 is adjustably carried through a screwhole 30 to a flag 36. Each flag 36 includes at its base 37, a hole that receives leading edge 34 of turning screw 32. Base 37 is threaded for a friction fit. The exact design and fitting of the various members that permit rotation of flag 36 are described in detail in copending U.S. patent application Ser. No. 09/178,402 which has been incorporated herein by reference.

After a rectangular hole has been cut in the building wall, the mounting device is inserted therein with flags 36 in their "retracted" position, two turning screws 32 inserted into screw holes 30 and turned clockwise causing flags 36 to rotate upward into their "extended" position as shown in the drawings. As turning screws 32 continue to turn clockwise, they draw pads 38 to the inside surface of the wall to hold mounting device 10 firmly in position.

Figure 4:
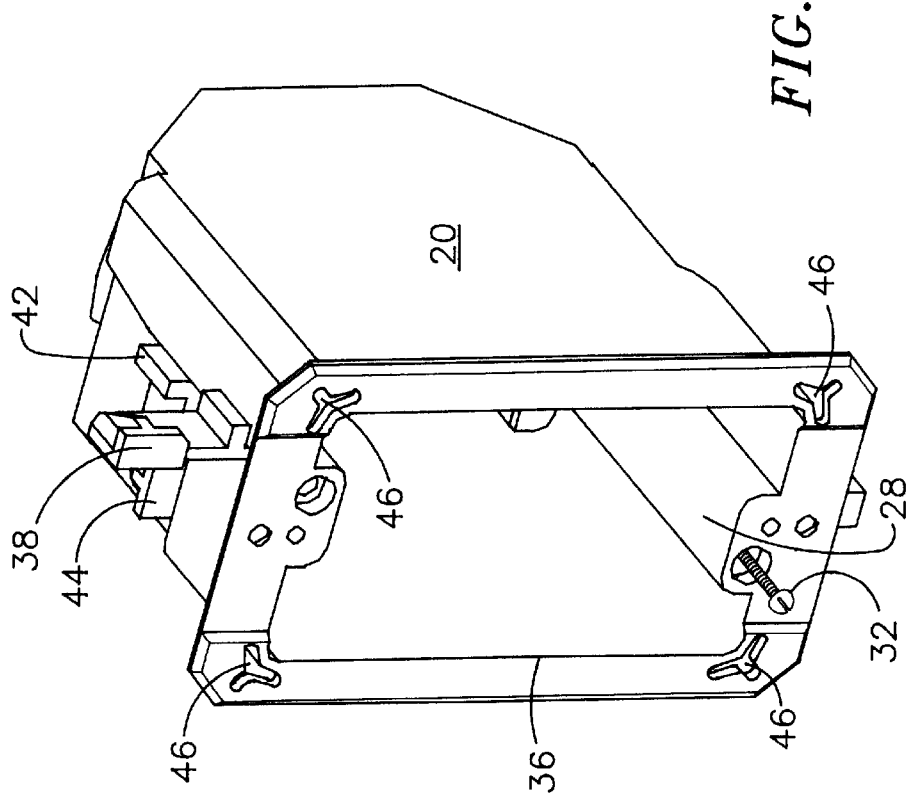
FIG. 4 is a perspective view of the mounting device of FIG. 1.
Figure 3:
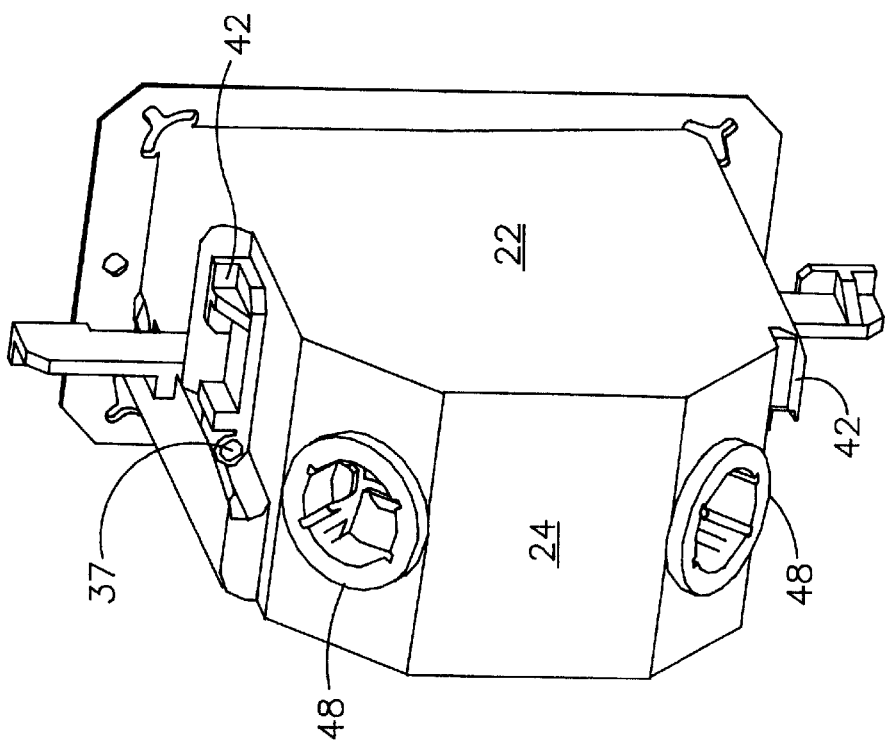
FIG. 3 is a rear view of the mounting device of FIG. 1.

As shown most clearly in FIGS. 3 and 4, according to a second highly preferred embodiment of the mounting device of the present invention, a second set of flags 42 can be included and rotatably mounted in mounting blocks 28 in line with and behind flags 36 for installation in a wall surface of a thickness greater than that engageble by flags 36. In this situation, turning of turning screws 32 as they frictionally engage the base 37 of flags 36 will cause flags 36 to attempt to reach their extended position. When flags 36 cannot deploy because of the presence of a too thick wall, turning screws 32 will continue to penetrate until they engage base 37 of flags 42 thereby causing flags 42 to rotate into their extended position with surface 44 engaging the rear surface of the thicker wall. At this time, flags 42 behave just as did flags 36 in the earlier description. FIGS. 3 and 4 are also useful in their depiction of flags 36 in their extended position and flags 42 in their retracted position.

The advantage of having mounting blocks 28 in the middle half (50%) of the opening of faceplate 12 is so that the forces that hold mounting device 10 in position are balanced. This is to be compared to having the force of turning screws 32 applied at the corners, as would be the case with standard retrofit electrical workboxes or in the case where fasteners are applied in slots 46 as described below.

After mounting device 10 has been firmly fixed in position, various other conventional devices such as electrical outlets, switches etc. and a cover plate can be mounted to mounting device 10 in the conventional manner through insertion of appropriate screws into holes 40 and 41.

Other elements of the mounting box 10 depicted in FIGS. 1–4 include arcuate slots 46 in each corner of open front plate 12. Slots 46 are positioned for receipt of fasteners such as sheet metal, wood or other screws or nails to secure mounting device 10 on a surface comprised of wood, metal or some other material of such a thickness and/or strength that it is impractical to utilize flags 36 and/or 42 to secure mounting device 10 in position. In this case the universality of mounting device 10 permits attachment in a more conventional manner through the use of conventional fasteners in slots 46 which are attached by insertion into the material of the wall to which attachment is being made.

Another feature of this preferred embodiment is the inclusion of threaded apertures (not shown) in the transition zone from rear side 24 and top 18 and bottom 16 of electrical box 14 for insertion and attachment of suitable threaded cable/wire retainers 48. Such threaded apertures, could, of course, be in rear side 24, if desired.

FIGS. 5–8 depict yet another embodiment of the mounting device of the present invention. According to this embodiment, all of the elements of mounting device 10 are identical to the earlier described embodiments of FIGS. 1–4 except that electrical box 14 has been modified to include more conventional knockouts 50 in the transition zone between the rear side 24 and top 18 and bottom 16 of electrical box 14. Knockouts 50 are in lieu of threaded apertures for receiving threaded wire/cable retainers 48 shown in FIGS. 1–4 and of the type found in general use in electrical outlet or working boxes commonly in use.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention be limited only by the scope of the appended claims.

What is claim is:

1. A plastic mounting device comprising:

an open front plate adapted to extend around an opening in a building wall;

an integral closed electrical box including top, bottom and rear portions extending rearward from said front plate and adapted to extend into said opening;

said front plate integral with said closed electrical box;

mounting blocks on said top and bottom portions;

a turning screw hole in each of said mounting blocks;

a threaded turning screw having a leading edge located in each of said turning screw holes;

at least one separate flag, having a base, rotatably attached to each of said mounting blocks;

a draw pad integral with said at least one separate flag;

and a hole in said base for receiving with a friction fit said leading-edge of said turning screws.

2. The mounting device of claim 1 wherein said open front plate is rectangular and said mounting blocks are located within the middle 50% of said top and said bottom portions.

3. The mounting device of claim 1 further including a second separate flag having an integral draw pad and a base, rotatably attached to each of said mounting blocks.

4. The mounting device of claim 3 including threaded apertures in said rear portion for receipt of threaded cable-retaining members.

5. The mounting device of claim 3 including transition zones between said top and bottom portions and said rear portion and threaded apertures in said transition zones for receipt of threaded cable-retaining members.

6. The mounting device of claim 3 wherein said open front plate is rectangular and said mounting blocks are located within the middle 50% of said top and said bottom portions.

7. The mounting device of claim 3 wherein said open front plate is rectangular and includes four corners each incorporating a slot for insertion of a fastener.

8. The mounting device of claim 1 including threaded apertures in said rear portion for receipt of threaded cable-retaining members.

9. The mounting device of claim 1 including transition zones between said top and bottom portions and said rear portion and threaded apertures in said transition zones for receipt of threaded cable-retaining members.

10. The mounting device of claim 1 wherein said open front plate is rectangular and includes four corners each incorporating a slot for insertion of a fastener.

* * * * *